US012704176B1

(12) United States Patent
Kim et al.

(10) Patent No.: US 12,704,176 B1
(45) Date of Patent: Aug. 11, 2026

(54) CABLE OPERATING HANDLE FOR MANUAL PARK RELEASE OF AUTOMATIC TRANSMISSION

(71) Applicant: Kyung Chang Industrial Co., Ltd., Daegu (KR)

(72) Inventors: Ji Soo Kim, Daegu (KR); Yong Soo Kang, Daegu (KR)

(73) Assignee: Kyung Chang Industrial Co., Ltd., Daegu (KR)

(*) Notice: Subject to any disclaimer, the term of this patent is extended or adjusted under 35 U.S.C. 154(b) by 0 days.

(21) Appl. No.: 19/084,634

(22) Filed: Mar. 19, 2025

(51) Int. Cl.

| | |
|---|---|
| ***F16H 63/34*** | (2006.01) |
| ***F16H 59/10*** | (2006.01) |
| ***F16H 61/36*** | (2006.01) |
| *F16H 61/28* | (2006.01) |

(52) U.S. Cl.
CPC ......... *F16H 63/3491* (2013.01); *F16H 59/10* (2013.01); *F16H 61/36* (2013.01); *F16H 2061/2884* (2013.01)

(58) Field of Classification Search
CPC ................ F16H 63/3491; F16H 61/36; F16H 2061/2884; F16H 2061/1224; F16H 59/10
See application file for complete search history.

(56) References Cited

U.S. PATENT DOCUMENTS 9,488,273 B2 * 11/2016 Hopkins ............. F16H 63/3491
10,697,542 B2 * 6/2020 Tucco ................. F16H 63/3491
10,793,127 B2 * 10/2020 Alu ......................... B60T 7/101

FOREIGN PATENT DOCUMENTS

KR 101395925 B1 * 5/2014 ............ F16H 61/24
KR 20-2014-0004862 U 9/2014
KR 10-1783264 B1 10/2017
WO WO-2017200535 A1 * 11/2017 ............ B60K 35/10

* cited by examiner

*Primary Examiner* — Bobby Rushing, Jr.
(74) *Attorney, Agent, or Firm* — BROADVIEW IP LAW, PC

(57) ABSTRACT

The present invention relates to a cable operating handle for manual park release an automatic transmission, and is configured to include a housing (210), a screw-shaped operating handle (220) configured to be moved up and down while rotating through the housing (210), and a guide (240) provided on an outer periphery of the operating handle (220) to linearly reciprocate up and down along the operating handle (220) and having one side to which a cable (230) is fixed to prevent any restriction on a surrounding layout configuration due to a narrow range of operation, and the handle is made of steel to increase an operating force.

15 Claims, 11 Drawing Sheets

-Prior Art-

-Prior Art-

-Prior Art-

-Prior Art-

-Prior Art-

CABLE OPERATING HANDLE FOR MANUAL PARK RELEASE OF AUTOMATIC TRANSMISSION

BACKGROUND

1. Field of the Invention

The present invention relates to a cable operating handle for manual park release of an automatic transmission, and more particularly, to a cable operating handle of a manual park release device of an automatic transmission provided so that an operating force of a cable for manual park release (MPR) is increased.

2. Discussion of Related Art

In general, a transmission of a vehicle is a device that operates a target shift gear within a gear range set according to a driving speed so that efficient driving is possible, and inside the vehicle, a shift lever is provided so that the automatic transmission operates at the target shift gear by moving the shift lever to each shift stage, that is, P (Parking), R (Reverse), N (Neutral), D (Drive), 2 (Second), and L (Low), according to a driver's will to operate the gear.

When operating the shift lever in this way to drive and then park the vehicle, the driver usually moves the shift lever to the P (Parking) stage, and in the case of some vehicles, when the ignition is turned off, the shift stage is automatically shifted to the Parking stage, and when the shift stage is shifted to P (Parking), a parking system that brakes the vehicle is operated.

Meanwhile, in the case of an emergency situation where the power supply is cut off due to an accident or other causes or a vehicle has to be forcibly moved, since a vehicle equipped with the automatic transmission cannot be moved when the gear is fixed in a P (Parking) state, a manual park release (MPR) device is provided to manually release the gear from the parking stage.

The manual park release device is operated only by manual operation, and is a technology that manually pulls a cable connected to the transmission to shift the transmission from the parking stage to the neutral stage and maintains the shifted state.

The cable for park release is operated by an operating handle mounted on a lower end of the vehicle or at a specific location, and an MPR system including the operating handle is usually located in a location that is not easily visible to prevent malfunction.

Examples of the conventional MPR device with reference to FIGS. 1 to 5 will be described.

As shown in FIGS. 1 and 2, in the conventional MPR device, a through hole 22 through which a work tool 30 may pass is formed in one side of a gate plate 20 that forms a movement path so that a shift lever 10 may move according to a shift pattern, and through the through hole 22, one end of the work tool 30 is inserted into an exposed groove 42 of a park release device 40 to operate a cable 50 so that a shift stage of a transmission 60 is moved from the P stage in FIG. 2 to the N stage in FIG. 3, thereby releasing a parking state.

An undescribed symbol 70 in the drawing is a configuration of an extending portion provided between the work tool 30 and the park release device 40, and reference numeral 44 represents a worm wheel gear around which the cable is wound.

However, in this case, since the park release operation is performed only inside a housing of the park release device 40 without any configuration exposed to the outside, there is no configuration that an operator may immediately check, so that there is a problem that a safety accident may occur as the vehicle rolls down due to its own weight, a slope, or the like, when park release is not recognized even though the parking state is released. Further, there is a risk of stroke loss because the cable is wound around the worm wheel gear.

Meanwhile, as another example of the park release device, a configuration that allows park release using a strap will be described with reference to FIG. 5.

The park release device using the strap is configured to include a lever bracket 130 fixed to a location adjacent to a driver's seat, a handle lever 110 pivotally installed on the lever bracket 130 and having one end of an emergency release cable 170 fixed thereto, a guide 120 coupled to the handle lever 110 to be linearly movable back and forth, a spring finger 140 that prevents the pivoted handle lever 110 from returning to its original location, and a guide pin 150 that prevents the handle lever 110 from being separated from the lever bracket 130 and pivotally supports the handle lever 110.

In FIG. 5, an undescribed symbol S represents a strap for operating the handle lever.

Since the related art using the strap has a wide operating range of the handle lever 110 with a strap S, when organizing the layout of the periphery, space should be secured so that the handle lever 110 may smoothly operate, and thus, there is a problem that limitations in design occur and, in order to increase a handle lever ratio, the length of the handle lever 110 should be increased and the size of the entire device is increased, accordingly.

Examples of the related art include Korean Utility Model Publication No. 20-2014-0004862 and Korean Patent Registration No. 10-1783264.

SUMMARY OF THE INVENTION

In order to solve the above-mentioned problems, the present invention is directed to providing a cable operating handle for manual park release of an automatic transmission to prevent any restriction on a surrounding layout configuration due to a narrow range of operation by forming a structure for operating a cable capable of manual park release in a screw type.

The present invention is also directed to providing a cable operating handle for manual park release of an automatic transmission by forming the handle with steel to increase an operating force.

The present invention is also directed to providing a cable operating handle for manual park release of an automatic transmission, having versatility when only a mounting bracket is manufactured to suit a vehicle layout.

The present invention is not limited to the technical tasks described above, and it is obvious that other technical tasks may be derived from the following description.

According to an aspect of the present invention, there is provided a cable operating handle for manual park release of an automatic transmission configured to include a cover housing, a screw-shaped operating handle configured to be moved up and down while rotating through the cover housing, and a guide provided on an outer periphery of the operating handle to linearly reciprocate up and down along the operating handle and having one side to which a cable is fixed.

In addition, the cable operating handle for manual park release of the automatic transmission is installed inside the frame around a driver's seat and configured to be covered or exposed by an opening/closing device provided in the frame.

In the operating handle, a head is constructed to be rotated by a wrench.

In addition, the guide is configured so that the guide does not rotate even when the operating handle is rotated, but is allowed to be only raised/lowered.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
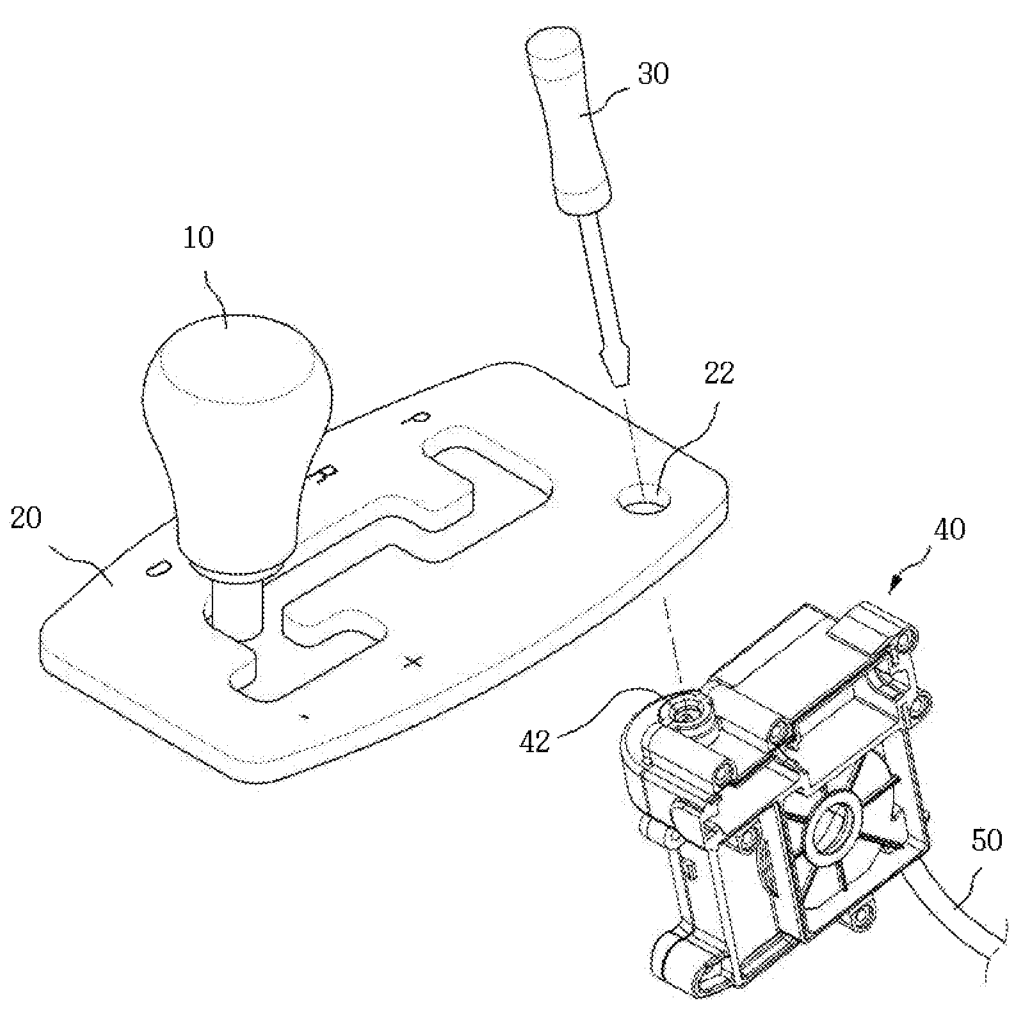
FIG. 1 is a perspective view showing an example of a conventional park release device.
Figure 2:
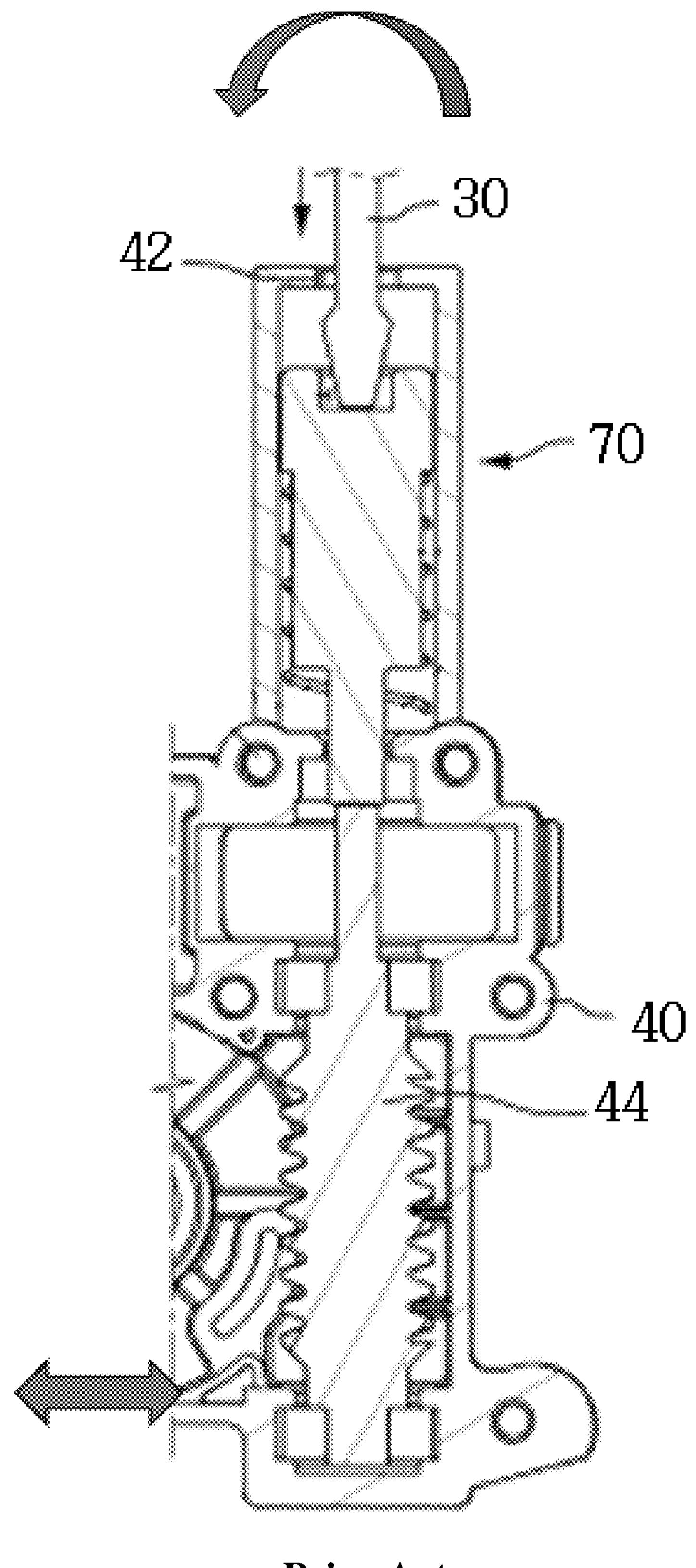
FIG. 2 is a cross-sectional view showing an internal configuration and operation example of the park release device of FIG. 1.
Figure 3:
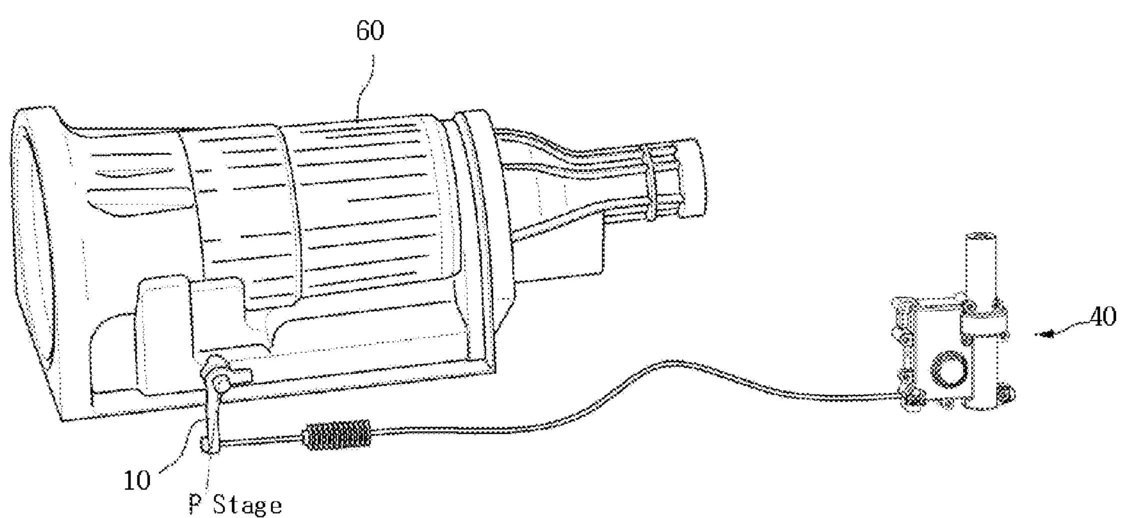
FIGS. 3 and 4 are views showing connection states of the conventional park release device and a transmission according to one embodiment.
Figure 4:
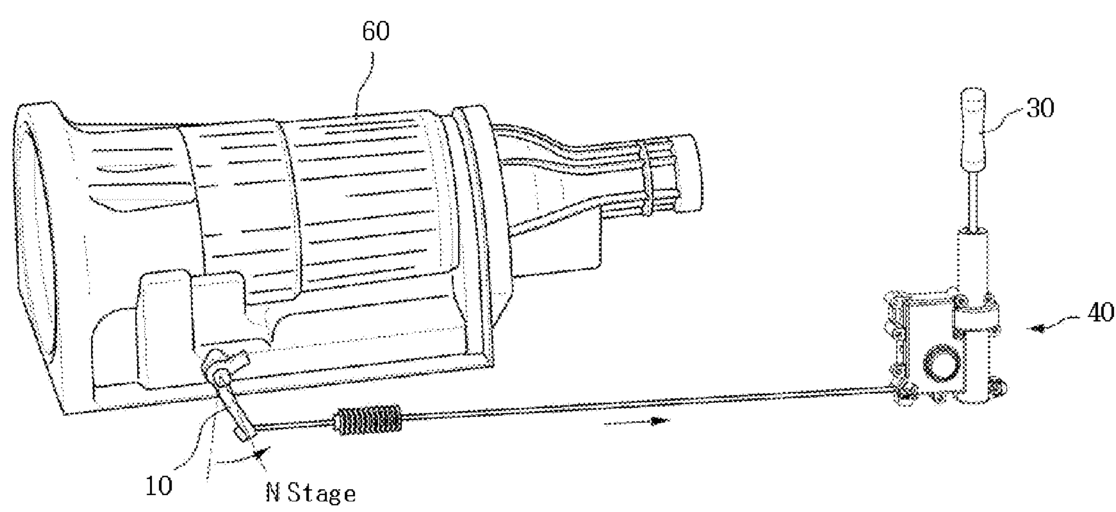
Figure 5:
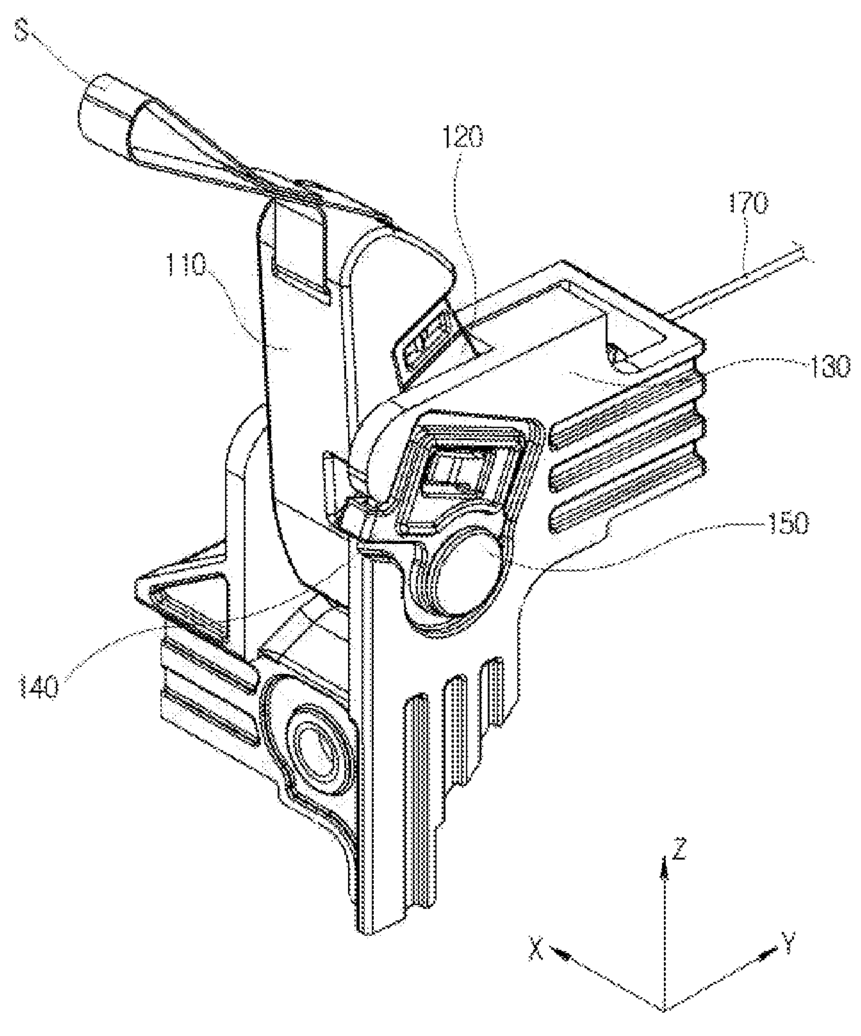
FIG. 5 is a view showing a conventional park release device according to another embodiment.

In the present specification, in adding reference numerals to the components of each drawing, it should be noted that the same components are given the same reference numerals as much as possible even though they are shown on different drawings.

Meanwhile, the meanings of the terms described in the present specification should be understood as follows.

Singular expressions should be understood to include plural expressions unless the context clearly defines otherwise, and the scope of rights should not be limited by these terms.

The terms "include" or "have" should be understood as not excluding the presence or addition of one or more other features, numbers, steps, operations, components, parts or any combination thereof.

Hereinafter, an embodiment of the present invention will be described in detail with reference to the accompanying drawings.

Figure 6:
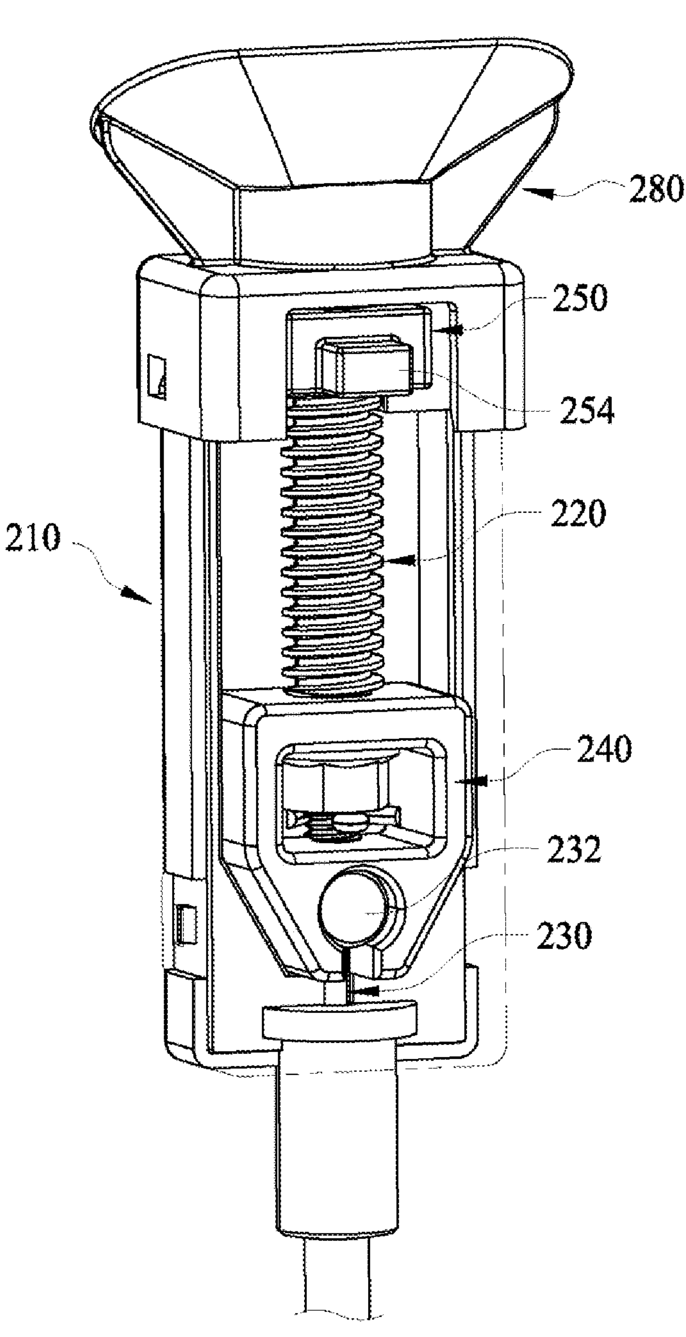
FIG. 6 is a view showing a configuration of a cable operating handle for manual park release of the present invention.
Figure 7:
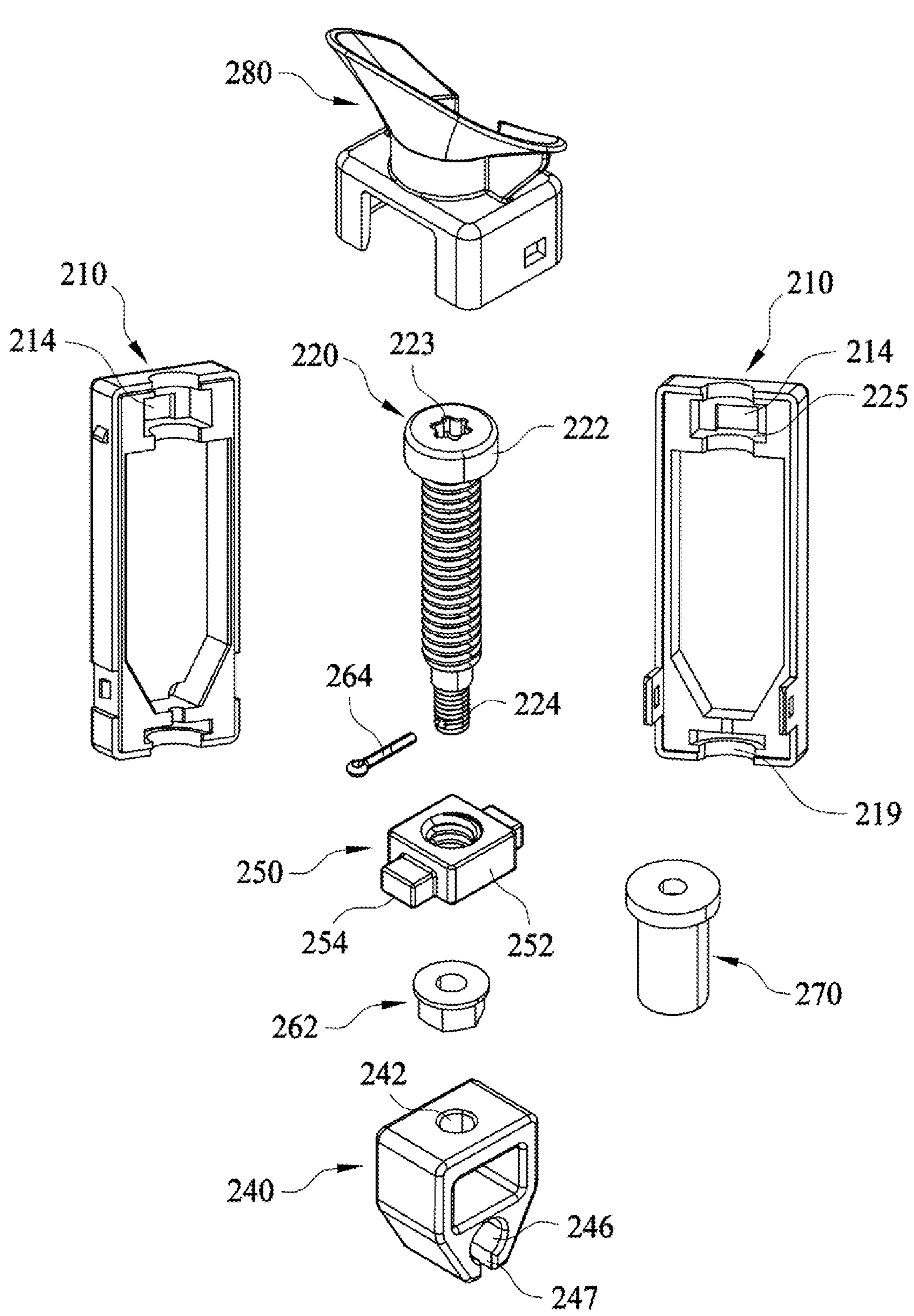
FIG. 7 is an exploded perspective view showing the configuration of the cable operating handle for manual park release according to the present invention.

FIG. 6 is a view showing a configuration of a cable operating handle for manual park release according to the present invention and FIG. 7 is an exploded perspective view showing the configuration of the cable operating handle for manual park release according to the present invention. For convenience of description, FIG. 6 shows an example where one side of a housing 210 is configured to be transparent.

The cable operating handle for manual park release according to the present invention is configured to include the housing 210, an operating handle 220, a cable 230, and a guide 240 as shown in FIGS. 6 and 7.

In addition, the cable operating handle for manual park release further includes a screw member 250, a cable socket 270, and a guide cover 280.

The housing 210 has an accommodating groove 212 that may accommodate the operating handle 220 and a guide 240 formed therein, and to this end, the housing 210 is formed into a pair of symmetrical parts that may be detachably attached to each other.

The accommodating groove 212 is formed to have a width and thickness corresponding to a width and thickness of the guide 240 to guide the guide 240 to be raised or lowered and is formed to have a length that may accommodate a raising/lowering length of the cable 230, and a lower portion thereof is formed to have a shape corresponding to the shape of the guide 240.

In an upper portion of the housing 210, an insertion groove 225 into which a screw member 250 to be described below is fixed is formed and a through hole 214 through which a fixing protrusion 254 of the screw member 250 passes is formed, and, in a lower portion of the housing 210, a fixing groove 219 to be coupled to the cable socket 270 is formed.

The handle 220 is formed of steel, so that a head 222 thereof is formed with an operating groove 223 at the center into which a wrench 300 is inserted so that the handle may be rotated by the wrench 300 to be described below, and a lower portion thereof is formed in a screw shape and is provided in the housing 210 by passing through the screw member 250 that is fixedly installed in the housing 210.

An end of the cable 230 is formed with a cable end 232 in a protruding shape, and in the embodiment of the present invention, the cable end 232 is formed in a cylindrical shape perpendicular to a central axis of the cable.

The guide 240 is formed with a predetermined width and thickness to be raised/lowed along the accommodating groove 212 inside the housing 210, and a guide hole 242 through which the operating handle 220 passes is formed at a center thereof, and the end of the cable 230 is fixed at a lower portion thereof.

In order to connect the cable 230 and the operating handle 220 in this way, the upper portion of the guide 240 is formed in a ring shape, and, in the embodiment of the present invention, is formed in a quadrilateral ring shape so that the guide hole 242 through which a lower portion of the operating handle 220 passes is formed in the upper portion, and an end of the operating handle 220 passing through the guide hole 242 is located inside the ring.

In addition, in a lower portion of the guide 240, an insertion groove 246 into which the end of the cable 230, that is, the cable end 232, is inserted and a guide groove 247 through which the cable 230 connected to the cable end 232 is guided are formed.

The screw member 250 is provided inside the upper portion of the housing 210 to allow the screw of the operating handle 220 to stably rotate, and another screw that engages with a screw of the operating handle 220 is formed therein.

The screw member 250 includes a body 252 which is formed with a size that may be installed on an upper inner side of the housing 210 and in which another screw is formed on an inner surface of a through hole formed in the center to engage with the operating handle 220, and the fixing protrusion 254 that is formed to protrude outwardly from the body 252 to protrude into the through hole 214 of the housing 210, thereby preventing the screw member 250 from rotating inside the housing 210.

Since the screw member 250 must be firmly fixed without rotating inside the housing 210, the body 252 is formed at an angle, and the inner surface of the housing 210 is also formed at an angle corresponding thereto.

Meanwhile, a nut 262 and a split pin 264 are provided at the end of the operating handle 220 located inside the ring through the upper guide hole 242 of the guide 240, so that the guide 240 is raised/lowered according to driving of the operating handle 220.

To this end, the nut 262 is coupled to the outside of the operating handle 220 so as to come into contact with the guide 240, and the split pin 264 is coupled to a lower portion of the nut 262.

The split pin 264 is a pin with a center folded and a ring-shaped loop formed at a folded portion, and an insertion hole 224 through which the split pin 264 passes is formed at the end of the operating handle 220, so that ends of the split pin 264 that are exposed opposite to the loop after passing through the insertion hole 224 are bent to opposite sides and installed in the operating handle 220.

Accordingly, when the operating handle 220 rotates, the nut 262 and the split pin 264 rotate in the same direction, the nut 262 is not allowed to be lowered by the split pin 264, and while the nut 262 rotates and rubs against the guide 240, the guide 240 is pulled in an up direction, which is a direction of movement of the operating handle 220, to generate a stroke.

The cable socket 270 is provided in the lower portion of the housing 210 to prevent the cable 230 from being separated from the housing 210 while guiding the insertion of the cable 230.

The cable socket 270 is formed in a cylindrical shape, with a cable 30 passing through the center and a flange 272 formed at an upper portion, and a fixing groove 219 into which the flange 272 is inserted and fixed is formed in the housing 210.

Further, the guide cover 280 is further provided at an upper end of the housing 210 to prevent other parts from being located on a raising/lowering path of the operating handle 220 while guiding the raising/lowering of the operating handle 220.

The guide cover 280 has an open upper portion, is formed to be wider toward the top from the bottom, and is formed, so that the upper end thereof is oblique so that one side is open for the operation of the wrench.

Figure 8:
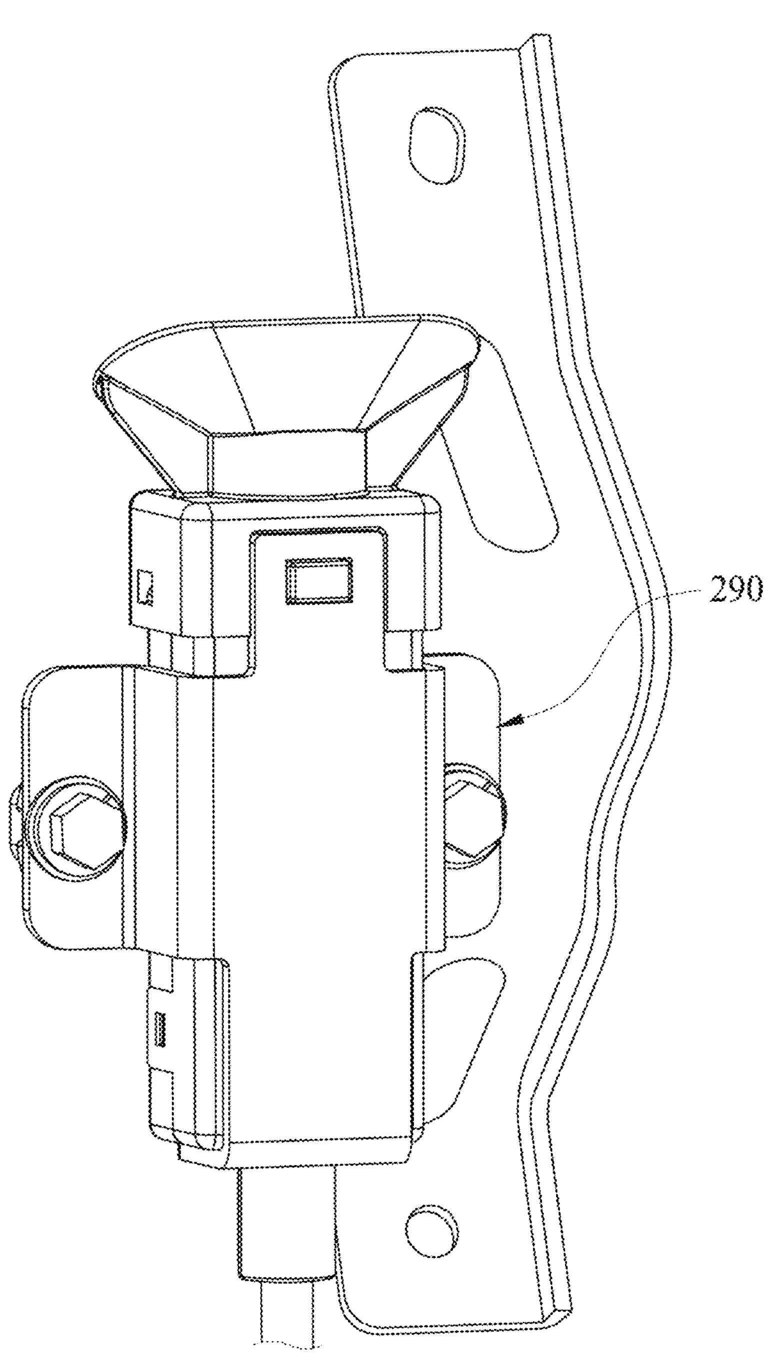
FIG. 8 is a view showing an example of installation through a mounting bracket of the cable operating handle for manual park release according to the present invention.
Figure 9:
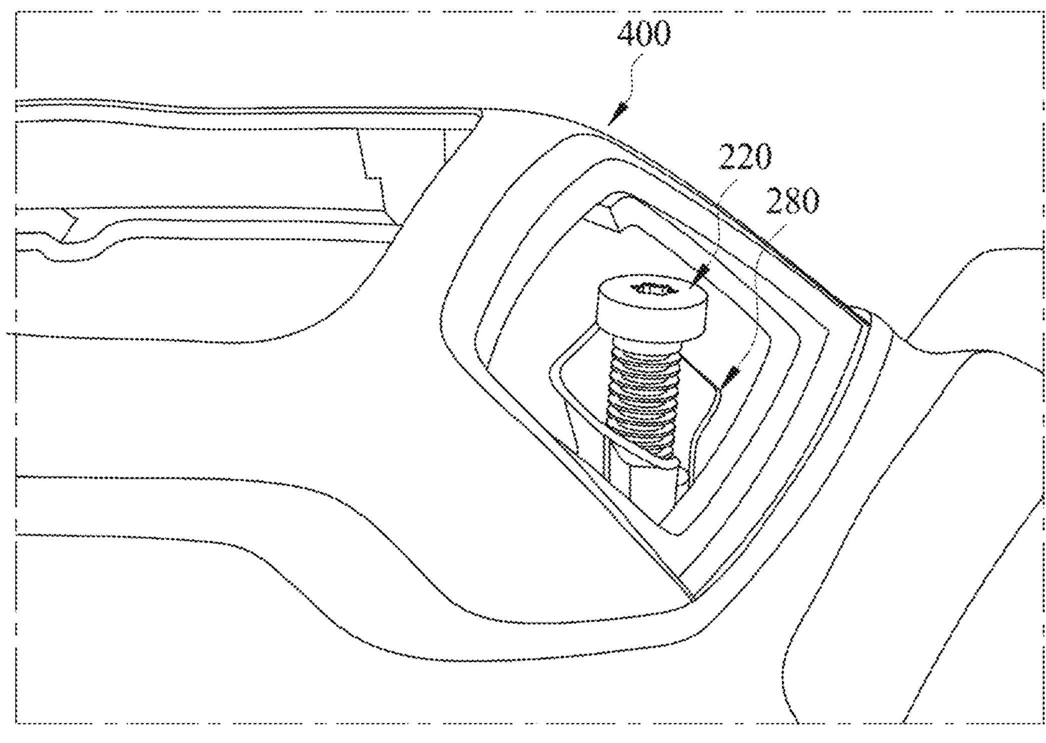
FIG. 9 is a view showing an example of installing the cable operating handle for manual park release according to the present invention on a center console frame.

FIG. 8 is a view showing an example of installation by a mounting bracket according to the present invention, and FIG. 9 is a view showing an example of installing the cable operating handle for manual park release on a vehicle interior frame, wherein FIG. 9 shows a state in which an opening/closing device of a center console frame 400 is opened.

The cable operating handle for manual park release according to the present invention is fixedly installed inside the vehicle through a mounting bracket 290 formed in a predetermined shape according to the vehicle as shown in FIG. 8.

Therefore, when only the mounting bracket is differently used depending on the vehicle type, the cable operating handle for manual park release may be applied to any vehicle type.

In addition, as shown in FIG. 9, the cable operating handle for manual park release is installed inside the frame around a driver's seat and configured to be covered or exposed by the opening/closing device provided in the frame.

In this case, the cable operating handle for manual park release may be installed anywhere on the frame inside the vehicle, but for convenience of operation, is installed around the driver's seat, and for example, is installed under the center console frame 400 as shown in FIG. 9.

The center console frame 400 is provided with a connectable or detachable opening/closing device (not shown) to expose or cover the operating handle 220 for cable operation of a manual park release device provided under the center console frame 400.

In this case, the opening/closing device may be provided to correspond to the outer shape of the center console frame only for the opening/closing operation, or may be configured as a storage box for storage.

In addition, the design of the opening/closing device may be modified in various ways, such as by having a catch protrusion and a catch groove formed so that the opening/closing device may be opened/closed by hand without a separate tool, or by providing a handle so that the opening/closing device may be forcibly inserted into the center console frame.

Figure 10:
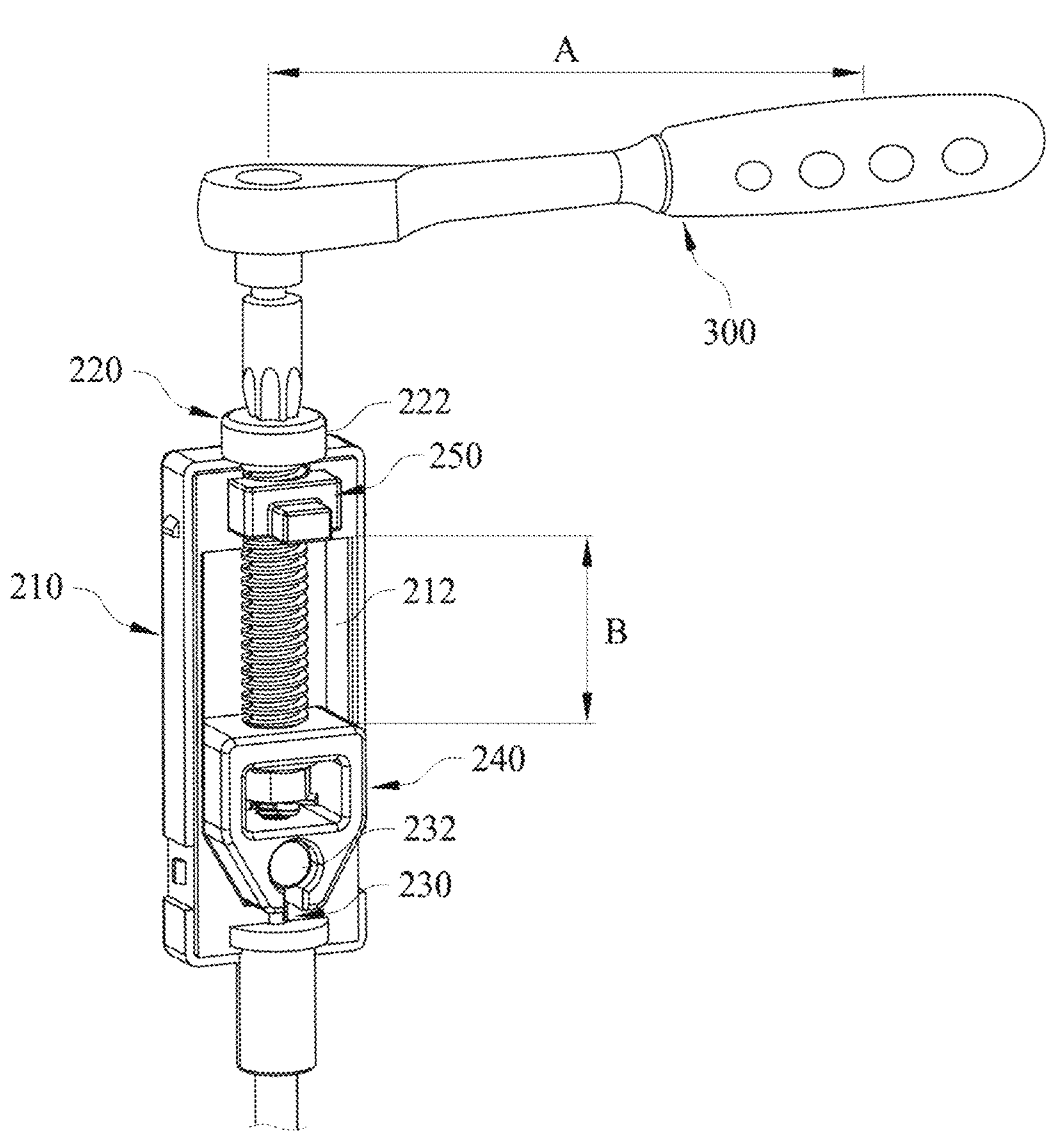
FIG. 10 is a view showing an example of the operation of the cable operating handle for manual park release according to the present invention.
Figure 11:
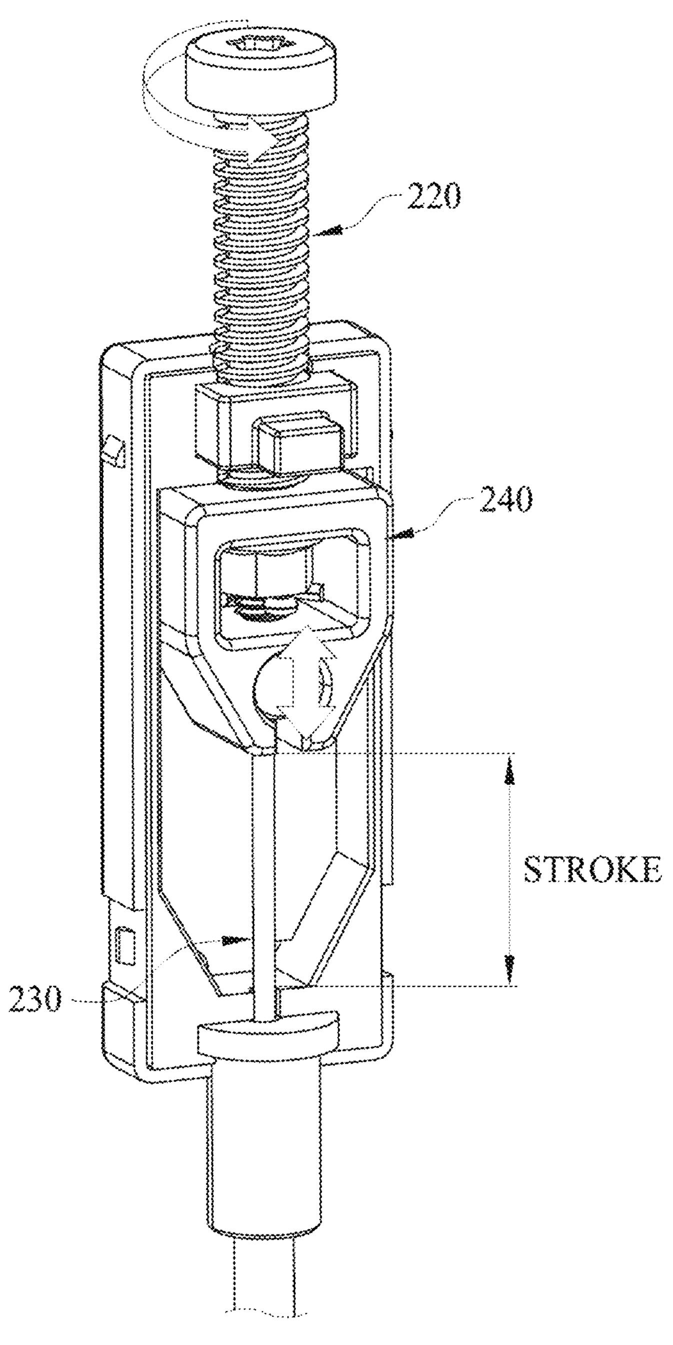
FIG. 11 is a view showing an example of driving the cable operating handle for manual park release according to the present invention.

Operations of the cable operating handle for manual park release according to the present invention formed in this way will be examined with reference to FIGS. 10 and 11.

FIG. 10 shows an example of operating a cable operating handle for manual park release according to the present invention using a wrench, and FIG. 11 is a view showing an example of raising/lowering an operating handle.

First, as shown in FIG. 9, the opening/closing device of the center console frame 400 is opened, and as shown in FIG. 10, the wrench 300 is inserted into the head 222 of the operating handle 220 to rotate the operating handle 220.

Accordingly, as shown in FIG. 11, when the operating handle 220 is raised or lowered, the guide 240 coupled thereto is also raised or lowered, and accordingly, the cable 230 is also raised and lowered by a stroke.

In this case, a length A of the wrench is 150 mm as shown in FIG. 10, a length B of the stroke is 28 mm, and, when a force of 20 N is applied to the wrench, a force generated at the cable end is 600 N, and an operating ratio is as high as 30, thereby enabling high load application.

In addition, by utilizing a friction coefficient of a screw, the park release state may be maintained, that is, self-locking is possible.

In addition, since the operation of the cable is linear along the operating handle, that is, the cable does not wind up, there is an effect of improving stroke accuracy.

In addition, since the opening/closing device of the center console frame 400 is not closed when the operating handle is raised (see FIG. 9), it is clearly recognized that the operating handle is raised, that is, the parking state is released, so that there is an effect of preventing a safety accident from occurring.

In addition, since the operating handle according to the present invention may be manufactured of steel, the maximum load that the operating handle may withstand is increased.

According to the present invention configured as described above, there is an effect of enabling the high-load operation, satisfying a self-locking function to provide excellent stroke accuracy, and accurately recognizing a park release operation, thereby ensuring the safety of a driver when manually releasing.

In addition, since the effects of the present invention described above are naturally exhibited by the configuration of the described contents regardless of whether the inventor is aware of the effects, the above-described effects are only some of the effects according to the described contents, and should not be recognized as describing all the effects known or actually existing by the inventor.

In addition, the effects of the present invention should be additionally understood by the entire description of the specification, and even if an effect is not stated in an explicit sentence, when the effect may be recognized as such by a person with ordinary skilled in the art to which the described content belongs through the present specification, the effect should be considered as the effect described in the present specification.

Those skilled in the art to which the present invention belongs could appreciate that the above-described present invention may be embodied in other specific forms without departing from the technical spirit or essential features.

Therefore, it should be appreciated that the embodiments described above are intended to be illustrative in all respects and not restrictive.

The scope of the present invention is represented by the claims to be described below rather than the above detailed description, and it is to be interpreted that the meaning and scope of the claims and all changes or modifications derived from the equivalents thereof fall within the scope of the present invention.

What is claimed is:

1. A cable operating handle for manual park release comprising:
- a housing;
- a screw-shaped operating handle configured to be moved up and down while rotating through the housing; and
- a guide provided on an outer periphery of the operating handle to linearly reciprocate up and down along the operating handle and having one side to which a cable is fixed.

2. The cable operating handle of claim 1, wherein, in the housing, an accommodating groove in which the operating handle and the guide are accommodable are formed, and
- the accommodating groove is formed to have a width and thickness corresponding to a width and thickness of the guideto guide raising/lowering of the guide.

3. The cable operating handle of claim 1, wherein in the operating handle, a head is constructed to be rotated by a wrench.

4. The cable operating handle of claim 1, wherein a guide hole through which the operating handle passes is formed at a center of the guide, and an end of the cable is fixed to a lower portion thereof.

5. The cable operating handle of claim 4, wherein an upper portion of the guide is formed in a ring shape to form the guide hole of the operating handle in an upper surface thereof, and a nut and a split pin are coupled to an end of the operating handle located inside the ring which is an end of the operating handle that passes through the guide hole so that the guide is raised/lowered according to driving of the operating handle.

6. The cable operating handle of claim 5, wherein the split pin is a pin whose center is bent so that a ring-shaped loop is formed at a bent portion thereof, and an insertion hole through which the split pin passes is formed at the end of the operating handle so that ends of the split pin opposite to the loop that are exposed by passing through the insertion hole are bent to opposite sides to prevent the nut from being lowered.

7. The cable operating handle of claim 4, wherein at the lower portion of the guide an insertion groove into which a cable end that is an end of the cable is inserted and a guide groove through which the cable connected to the cable end is guided are formed.

8. The cable operating handle of claim 1, wherein, in the housing, a screw member in which another screw that engages with a screw of the operating handle is formed so that the operating handle is configured to be raised/lowered while rotating is further provided, a fixing protrusion is formed to protrude on an outer side of the body, and a through hole through which the fixing protrusion passes is formed in the housing.

9. The cable operating handle of claim 8, wherein the body of the screw member is angularly formed, and an inner surface of the housing is also formed to correspond thereto.

10. The cable operating handle of claim 1, wherein a cable socket through which the cable passes is further provided in a lower portion of the housing.

11. The cable operating handle of claim 1, wherein a guide cover is further provided at an upper end of the housing to prevent other parts from being located on a raising/lowering path of the operating handle while guiding raising/lowering of the operating handle.

12. The cable operating handle of claim 11, wherein the guide cover has an open upper portion, is formed to be wider toward a top from a bottom, and is formed so that an upper end thereof is oblique.

13. The cable operating handle of claim 1, wherein the cable operating handle is installed inside a frame around a driver's seat and configured to be covered or exposed by an opening/closing device provided in the frame.

14. The cable operating handle of claim 13, wherein the frame around the driver's seat is a center console frame.

15. The cable operating handle of claim 1, wherein the cable operating handle is fixedly installed inside a vehicle through a mounting bracket formed in a predetermined shape according to the vehicle.

* * * * *